United States Patent
Kaney et al.

(10) Patent No.: US 7,291,812 B2
(45) Date of Patent: Nov. 6, 2007

(54) PROGRAMMABLE COOKER

(75) Inventors: Howard Wayne Kaney, West Bend, WI (US); Alistair Hugh Tatham Mackay, Melbourne (AU)

(73) Assignee: Focus Products Group, LLC, Vernon Hills, IL (US)

( * ) Notice: Subject to any disclaimer, the term of this patent is extended or adjusted under 35 U.S.C. 154(b) by 160 days.

(21) Appl. No.: 11/119,624

(22) Filed: May 2, 2005

(65) Prior Publication Data

US 2006/0249504 A1 Nov. 9, 2006

(51) Int. Cl.
*A47J 27/00* (2006.01)
*A47J 36/00* (2006.01)
*H05B 1/02* (2006.01)

(52) U.S. Cl. .................. 219/435; 219/432; 219/433; 219/441; 99/403

(58) Field of Classification Search ............... None
See application file for complete search history.

(56) References Cited

U.S. PATENT DOCUMENTS

| 6,063,421 | A | * | 5/2000 | Barravecchio | ............ | 99/325 |
| 6,362,459 | B1 | | 3/2002 | Schmidt | | |
| 6,523,457 | B1 | * | 2/2003 | Ancona et al. | ............ | 99/409 |
| 6,573,483 | B1 | | 6/2003 | DeCobert et al. | | |
| 6,740,855 | B1 | | 5/2004 | DeCobert et al. | | |
| 6,872,921 | B1 | * | 3/2005 | DeCobert et al. | ............ | 219/441 |
| 7,109,445 | B2 | * | 9/2006 | Patterson et al. | ............ | 219/438 |
| 2003/0124213 | A1 | * | 7/2003 | Ancona et al. | ............ | 99/403 |

FOREIGN PATENT DOCUMENTS

JP 03-029619 A * 2/1991

OTHER PUBLICATIONS

PANASONIC; Electronic Rice Cooker/Warmer; Operating Instructions SR-CF05P; pp. 1-25.
PANASONIC; Operating Instructions; Electronic Rice Cooker/Warmer with Steamer & Slow Cooker Functions; SR-FU15AP; pp. 1-16.
ZOJIRUSHI; Micom Rice Cooker/Warner; Operating Instructions; NS-ZAC10$_{(1.0L)}$/NS-ZAC18$_{(1.8L)}$; pp. 1-84.
Chefline Expands Cookware Lineup, Makes Small Electrics Entrance; Home World Business, Jan. 4-19, 1999, pp. 48-50; vol. 11 No. 1.

* cited by examiner

*Primary Examiner*—Joseph Pelham
(74) *Attorney, Agent, or Firm*—Michael Best & Friedrich LLP

(57) ABSTRACT

A cooking appliance configured with a programmable controller within a heating unit. The programmable controller is configured to control a plurality of functions of the cooking appliance. The controller is located in the base of the appliance and is in communication with a control panel that transmits a plurality of signals to the controller indicative of a user input. The control panel can be arranged nearly flush with an outer surface of the cooking appliance.

51 Claims, 6 Drawing Sheets

PROGRAMMABLE COOKER

BACKGROUND

This invention relates to programmable cooking appliances.

Numerous cooking appliances improve the speed and convenience of cooking meals. The convenience of these appliances has been greatly improved by the use of programmable controllers or devices. However, programmable devices, often made from silicon-based, integrated circuits, can be adversely affected by heat. Thus, it is known to use a controller housing positioned outside the heating unit and configured with ventilation holes or insulation to help ensure that the controller stays within an acceptable temperature range. Such housings, however, tend to protrude from the appliance and thereby increase its overall size and the space required to use it.

SUMMARY

The inventors have learned that it is possible to position a controller for a cooking appliance within a heating unit while still maintaining the controller within an acceptable temperature range. Among other advantages, the positioning of the controller in this location decreases the size of the appliance and the space needed to store and use it, and provides a sleek-looking unit.

One embodiment of the invention provides a cooking appliance including a housing with a base, which generally comprise a heating unit. The cooking appliance also includes a heating well having a heating element and a cooking unit adapted to fit at least partially within the heating unit. A control panel is mounted to the housing. The control panel includes a display and at least one input mechanism, but lacks a programmable controller. The programmable controller is positioned within the heating unit and is configured to communicate with the control panel to receive input information from the at least one input mechanism and to control the heating element.

Another embodiment provides a cooking appliance including a housing with a base, which generally comprise a heating unit. A cooking unit is configured to fit within the housing and a heating element is configured and positioned to heat the cooking unit. A control panel is mounted on the housing. The control panel includes a display and at least one input mechanism and is configured without a programmable device. Instead, a programmable controller is positioned within the heating unit, and configured to communicate with the control panel to receive input information from the at least one input mechanism, and control the heating element.

Another embodiment provides a method of using a programmable cooking appliance with a housing and a base, which generally comprise a heating unit. The method includes providing a cooking unit configured to hold food; associating a heating element with the cooking unit; configuring a control panel without a programmable device; positioning the control panel on the heating unit such that it protrudes from the outer surface of the housing one quarter of an inch or less; delivering one or more signals from the control panel to a programmable controller located within the heating unit; and configuring the controller to control operation of the heating element based upon information input by a user through the control panel. The method may also include selecting a cooking temperature and time using the control panel, configuring the controller to change an operating mode of the appliance from a cooking mode to a warming mode upon an expiration of the cooking time, or both.

Another embodiment provides a method of maintaining a programmable device in a cooking appliance within an acceptable temperature range. The method includes providing a heating unit comprising a housing with a base; configuring a cooking unit to fit within the housing; positioning and configuring a heating element to heat the cooking unit; configuring a control panel with at least one input mechanism and a display, but without a programmable device; mounting the control panel on the housing; and positioning a programmable controller within the heating unit and configuring the programmable controller to communicate with the control panel to receive input information from the at least one input mechanism and to control the heating element.

Other features and embodiments of the invention will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
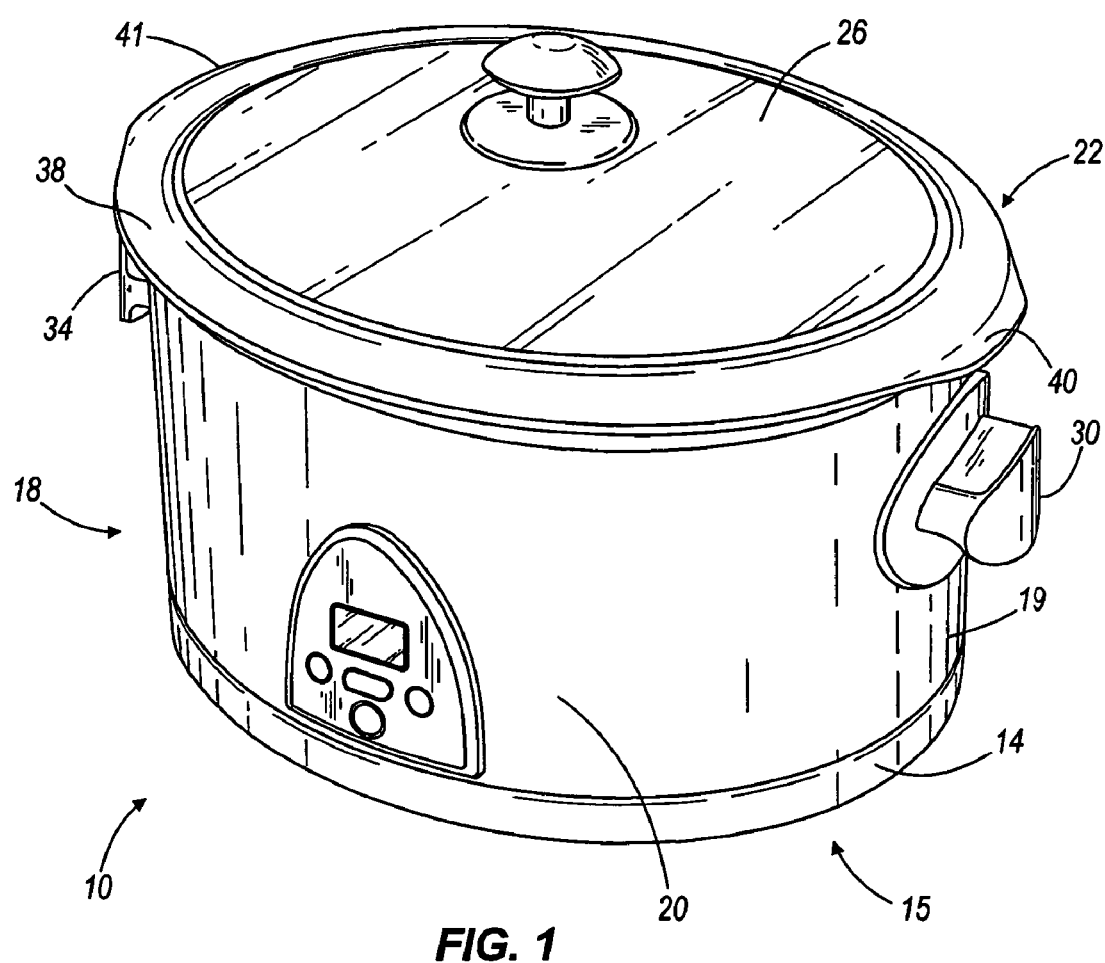
FIG. 1 is a perspective view of an exemplary cooking appliance.

FIG. 1 illustrates an exemplary cooking appliance 10. The cooking appliance 10 includes a base 14 having a bottom 15, an outer housing 18 with an outer surface 19 and front face 20, a cooking unit 22, and a cover 26. Two handles 30, 34 are located on opposite sides of the outer housing 18, and can be used to transport the cooking appliance 10 from one surface (e.g., counter top, table, and the like) to another. The cooking unit 22 fits at least partially inside of the outer housing 18, and is supported by a cooking unit lip 38. The cover 26 sits in a recessed area on the top of the cooking unit 22. The cooking unit 22 can be lifted out of and removed from the outer housing 18 for serving or cleaning purposes. To allow for easier removal, the lip 38 of cooking unit 22 can include two portions 40 and 41 that extend or project beyond the cooking unit's perimeter to serve as handles for the cooking unit. The cooking unit 22 may be comprised of a ceramic material and coated in a hard glaze. The glaze protects the ceramic material from damage, and also provides a non-porous, non-hazardous material that is suitable for holding food.

Figure 2:
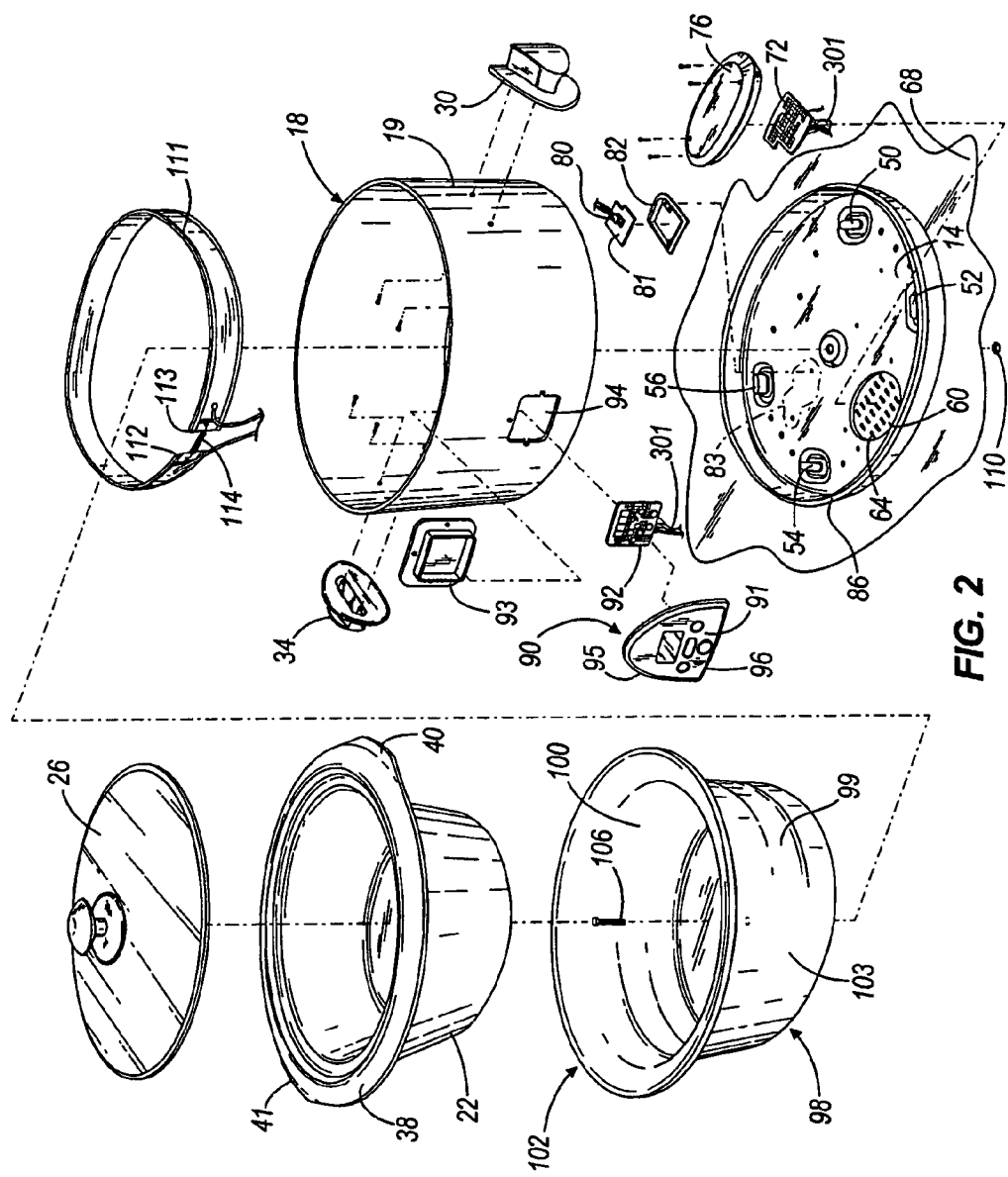
FIG. 2 is an exploded view of the exemplary cooking appliance.

FIG. 2 is an exemplary exploded view of the cooking appliance 10. The dashed line in FIG. 2 is used to show the general relationship between the components of the cooking appliance 10. For instance, several of the components of the cooking appliance 10 are arranged in, or on top of, one another as described in greater detail below.

The base 14 of the cooking appliance 10 includes four support "feet," 50, 52, 54, 56 and a depression 60 having a plurality of ventilation holes 64. The feet 50-56 can be made of rubber, or similar substances, and support the cooking appliance 10 when it is placed on a surface, such as surface 68. The feet 50-56 are arranged such that there is a gap between surface 68 and the bottom 15. The gap allows air to move beneath the bottom 15 of the base 14.

In the embodiment shown, several components are coupled to or otherwise positioned on the base 14. A main circuit board 72 is fixedly mounted within the circuit board cover 76, which is coupled to the inside of the base 14. In the embodiment shown, the main circuit board 72 is placed above the depression 60. The circuit board cover 76 can be made of a heat resistant plastic and arranged so that it surrounds the main circuit board 72 when it is coupled to the base 14 to shield the main circuit board 72 from heat generated within the heating unit. The amount of shielding may vary according to the configuration and position of the cover 76 as well as the material from which the cover 76 is made.

As will be discussed in greater detail below, the main circuit board 72 includes devices used to control a power signal from a power source such as a household electrical outlet that supplies a 120V, 60 Hz signal. The main circuit board 72 also includes a programmable device (discussed below). The programmable device includes software that controls operations of the cooking appliance 10, such as cooking time and temperature. In certain embodiments, a triac 80 is used to control the power that is supplied to a heating element (described below) of the cooking appliance 10. The triac 80 is electrically coupled to, but spaced from the main circuit board 72 (and the programmable device on the circuit board 72). In the embodiment shown, the triac 80 is mounted to a metal plate 81. The metal plate 81 is, in turn, positioned on a triac plate 82. The triac plate 82 can be made of a rigid, heat resistant plastic or similar substance comparable to that of the main circuit board cover 76. The triac plate 82 is positioned on a middle portion 83 of the inside of the base 14. When it is operating, the triac 80 generates heat. By separating or spacing the triac 80 away from the main circuit board 72, the detrimental effects of the heat generated by the triac 80 on the programmable device are reduced. At the same time, the heat generated by the triac 80 is used to supplement the heating accomplished by a heating element (described below).

In the embodiment shown, the triac plate 82 and programmable circuit board cover 76 are coupled to the inside of the base using a plurality of screws. Numerous other devices could be used to fix or otherwise locate these components in desired positions. The outer housing 18 is arranged so that it surrounds a lip 86 of the base 14. The outer housing 18 may be shaped in a manner such that it is mated, pressure fit, or otherwise connected to the lip 86 of the base 14 so that the outer housing 18 and base 14 together form a heating unit.

A user interface or control panel 90 is coupled to the front face 20 of the outer housing 18. The control panel 90 includes a face 91 and is associated with a circuit board 92, which includes various electrical components that are described below with respect to FIG. 5. The circuit board 92 is secured within a circuit board housing 93 that can be made of a heat resistant plastic or similar substance. The circuit board housing 93 is mounted by screws within the heating unit to the inside of the front face 20 and extends, at least partially, through a hole 94. The circuit board 92 is thus positioned inside of the outer housing 18. The appliance 10 does not include a programmable controller, microprocessor, or similar device in the control panel 90. By not including such a device in the control panel 90, heat concerns that may be associated with placing a programmable device near a heating element, in a heated environment, or in a location that may be subject to heat (such as the hole 94) are reduced.

The control panel face 91 is shown as having a parabolically-shaped edge 95 and a relatively-straight edge 96. The control panel face 91 may be sized and positioned such that it only protrudes slightly from the outer surface 19 of the outer housing 18, such as, for example, one quarter of an inch or less. The control panel 91 may be shaped differently and configured such that it is flush or substantially flush with the outer surface 19 or protrudes more than shown, although a relatively small amount of protrusion helps create a slim, streamlined profile for the appliance 10 and reduces the overall space it occupies.

Referring still to FIG. 2, a heating well 98 (having a continuous sidewall 99) is positioned above the base 14, and surrounded by the outer housing 18, to support the cooking unit 22. The continuous sidewall 99 has an interior surface 100 that defines a well-like chamber 102 and an exterior surface 103. The heating well 98 can be made of metal (e.g., aluminum) or other material that has the ability to meet and/or withstand any needed or required heating and heat conditions associated with the operation of the appliance 10. The heating well 98 can be shaped similar to the shape of the cooking unit 22, so that the cooking unit 22 fits inside of the heating well 98. The heating well 98 may be mounted or coupled to the base 14 in a variety of ways. In the embodiment shown in FIG. 2., a bolt 106 and a nut 110 are used to couple the heating well 98 to the base 14. In other embodiments, the heating well can be coupled to the base by a tube and friction retaining ring, or by other suitable attachment mechanisms (e.g., one or more screws, nuts and bolts, rivets, etc.). The heating well 98, outer housing 18, and base 14 define an interior space of the heating unit.

Heat is generated by a heating element 111. The heating element 111 has a first end 112 and a second end 113. In the embodiment shown, the heating element 111 is configured to wrap around the heating well 98. The heat generated by the heating element 111 is transferred to the heating well 98 and, in turn, transferred to the cooking unit 22. The heating element 111 can be made of thin, flexible metal that has the ability to withstand required or desired heat conditions of the appliance 10, and can be comprised of several thin layers, positioned one on top of the other. The ends 112 and 113 of the heating element 111 are coupled together by a spring 114, which provides a biasing force to help keep the heating element 111 in place around the heating well 98. In other embodiments, the heating element 111 can be coupled to or positioned in relation to the heating well 98 in other ways (e.g., adhesive or cohesive material, clamps, clips, fasteners, and the like).

Figure 2A:
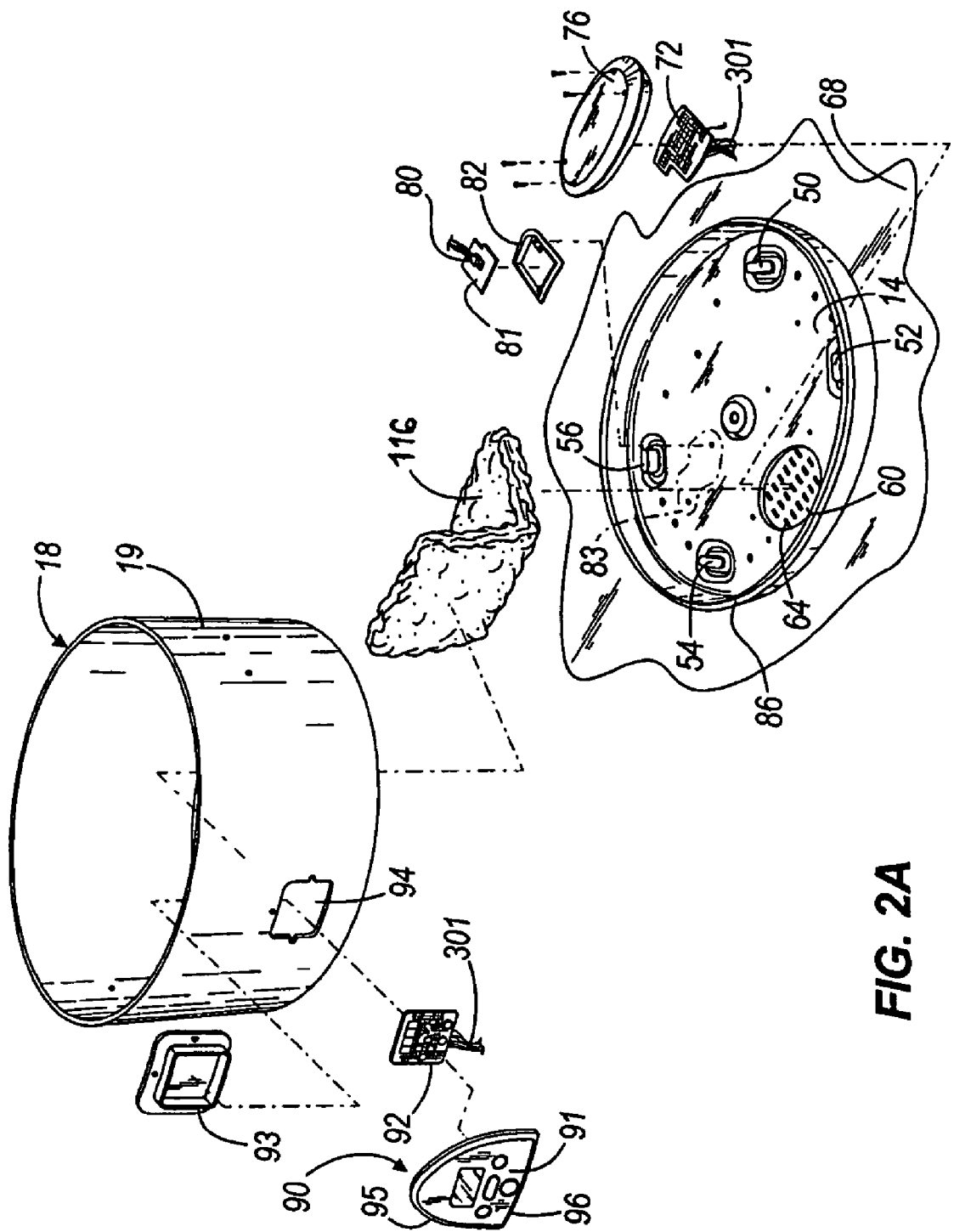
FIG. 2A is a second exploded view of the exemplary cooking appliance.

As shown in FIG. 2A, insulation 116 may be positioned inside the housing 18 between the circuit board 92 and heating element 111 to help shield the circuit board 92 from heat. The insulation 116 may be L-shaped and continue down into the base 14 to help insulate the circuit board 72 from heat.

Figure 3:
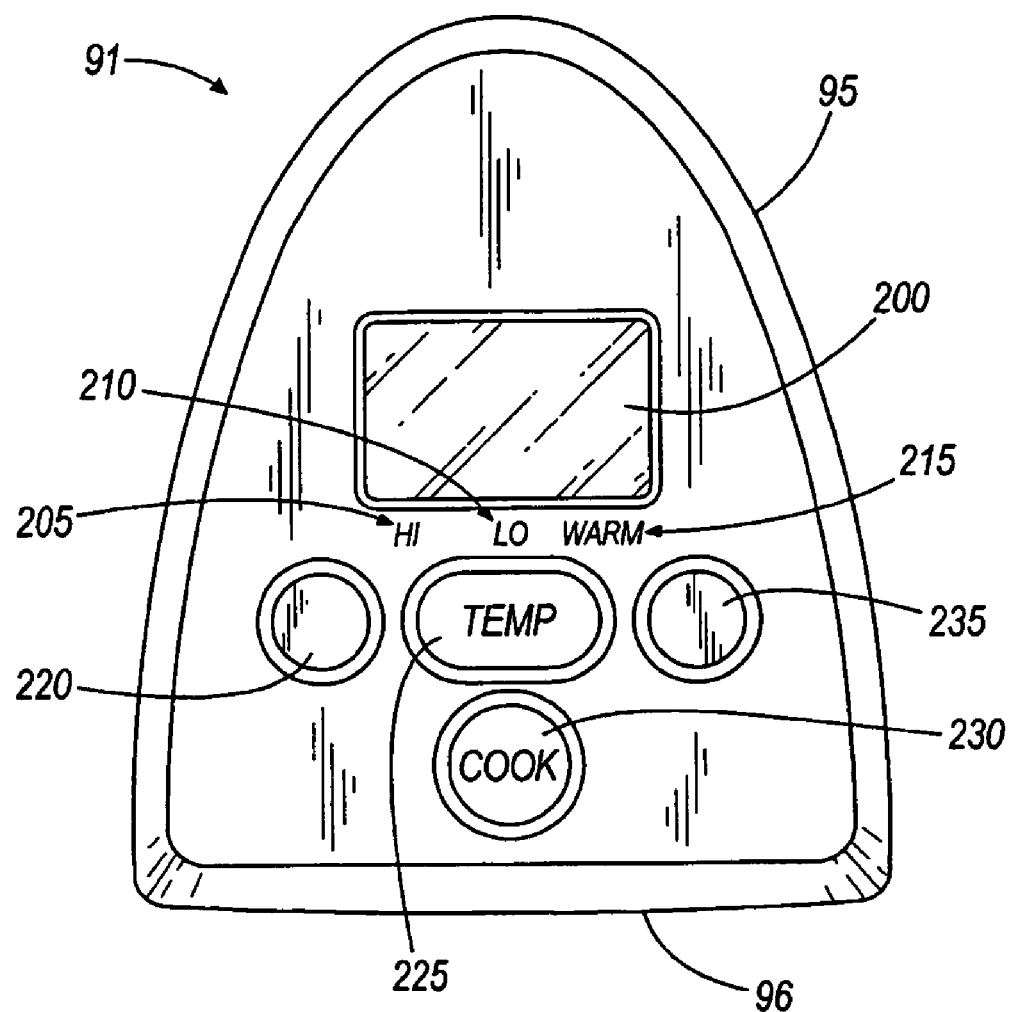
FIG. 3 is a control panel of the cooking appliance.

A detailed view of the exemplary control panel face 91 is shown in FIG. 3. In the embodiment shown, the control panel face 91 includes a liquid crystal display ("LCD") 200. The LCD 200 may be a seven segment display, although other types of displays are possible. The control panel face 91 also includes a plurality of markings 205-215 shown as "HI," "LO," and "WARM" and a plurality of input buttons 220-235. In the embodiment shown, the markings are lit from behind with a plurality of LED's (discussed below).

The LCD 200 and the markings 205-215 provide visual information to a user of the cooking appliance 10. The LCD 200 can be used to display information indicative of operations or conditions of the cooking appliance 10. For example, certain temperature and cooking-cycle information can be displayed on the LCD 200. Cooking cycle information can include information such as the time and temperature of cooking and whether a "warming" mode is activated after cooking is complete. In one embodiment, elapsed time is displayed on the LCD 200. Elapsed time may be displayed in a "count up" manner or a "count down" manner, such that the time elapsed since a cooking cycle began is displayed or the time remaining in a programmed cooking cycle is displayed. Information displayed on the LCD 200 can also indicate whether power has been applied to the cooking appliance 10. The markings 205-215 can be used to indicate a condition or operation of the cooking appliance 10 when lit by LEDs 216-218 (shown in FIG. 4). (Of course, other lights or sources of illumination could be used in place of or in addition to the LEDs. To simplify the written description and claims, the term LED is used herein to encompass LEDs and any other lights, lamps, or source of illumination.) An LED can be lit behind the HI marking 205 to indicate a HI temperature setting has been selected by the user, and a cooking cycle has begun. A flashing LED can also be used to indicate that a temperature setting has been selected, but a cooking cycle has not yet been started.

In the embodiment shown, the control panel 90 includes a number of input mechanisms or buttons including an On/Off button 220, a TEMP button 225, a COOK button 230, and a "timer" button 235. In other embodiments, however, more or fewer input buttons can be used in the control panel 90, depending on the type of user input desired, and the examples provided are not intended to be limiting.

The On/Off button 220 is used to control a power signal supplied to the appliance 10. The TEMP button 225 is used to control the selection of temperature settings. The embodiment shown includes three temperature settings: HI, LO, and WARM. In addition to the different cooking temperature settings, the cooking appliance 10 shown includes different cooking modes. The clock button 235 is used to control the selection of a manual mode and a timed mode. In a manual mode, the user can begin and end a cooking cycle manually with the input buttons 220-235. In a timed mode, the user can program a desired cooking time with the clock button 235. For each actuation of the clock button 235, the programmed time is increased one hour, although other time increments can be used. After the programmed cooking time expires in the timed mode the cooking appliance can shift to another temperature setting and mode automatically, such as a WARM mode. In one embodiment, power to the cooking appliance 10 is automatically turned or shut off after a predetermined amount of time, such as twenty hours. The automatic power shut-off feature may be configured such that the user may disable it. In certain embodiments, heat is not applied to the cooking unit 22 until the COOK button 230 is actuated. In other embodiments, heat is applied to the cooking unit automatically after the On/Off button 220 is actuated.

Several of the input buttons 220-235 may be pressed in sequence to achieve a desired operation. The sequence of starting a cooking cycle in the manual mode as well as the timed mode can be achieved by the following exemplary user input sequences:

Manual Mode:
  Actuation of the On/Off button 220. When actuated, "ON" is displayed on the LCD 200 and the HI temperature setting is indicated by the LED 218.
  Actuation of the TEMP button 225. Actuating the TEMP button 225 multiple times allows the selection of HI, LO, or WARM settings.
  Actuation of the COOK button 230. When actuated, the cooking cycle begins and numerals on the LCD 200 count up, displaying the elapsed cooking time.

Timed Mode:
  Actuation of the On/Off button 220. When actuated, "ON" is displayed on the LCD 200 and the HI temperature setting is indicated by the LED 218.
  Actuation of the TEMP button 225. Actuating the TEMP button 225 multiple times allows the selection of HI, LO, or WARM settings.
  Actuation of the TIME button 235. Actuating the TIME button 235 multiple times allows the selection of a desired cooking time.
  Actuation of the COOK button 230. When actuated, the cooking cycle begins, and numerals on the LCD 200 count down, displaying the remaining programmed time of the previous step. When the programmed time of the previous step is completed, the cooking appliance 10 shifts to a WARM temperature setting and numerals on the LCD 200 count up, displaying the elapsed warming time.

The user input sequences listed above are examples only, and should not be considered as limiting the functionality of the cooking appliance 10. Additionally, in some embodiments, it is possible to have the temperature setting changed by the user at any time, including during a programmed cooking cycle (e.g., timed mode). The cooking appliance 10 can also change cooking cycles automatically, depending on the temperature setting that is selected. For example, if the cooking appliance 10 is in the timed cooking mode, and the WARM temperature setting is selected by the user, the cooking appliance 10 can end the timed cooking mode and shift to the manually selected mode. Additionally, if the cooking appliance 10 is in the timed cooking mode with the HI temperature setting selected, and the temperature setting is changed to LO (or vice versa) at any point during the cooking cycle, the cooking appliance makes an audible alert and automatically resumes cooking in the new temperature setting. The transition to the new temperature setting may occur after a predetermined time duration (e.g., five seconds).

Figure 4:
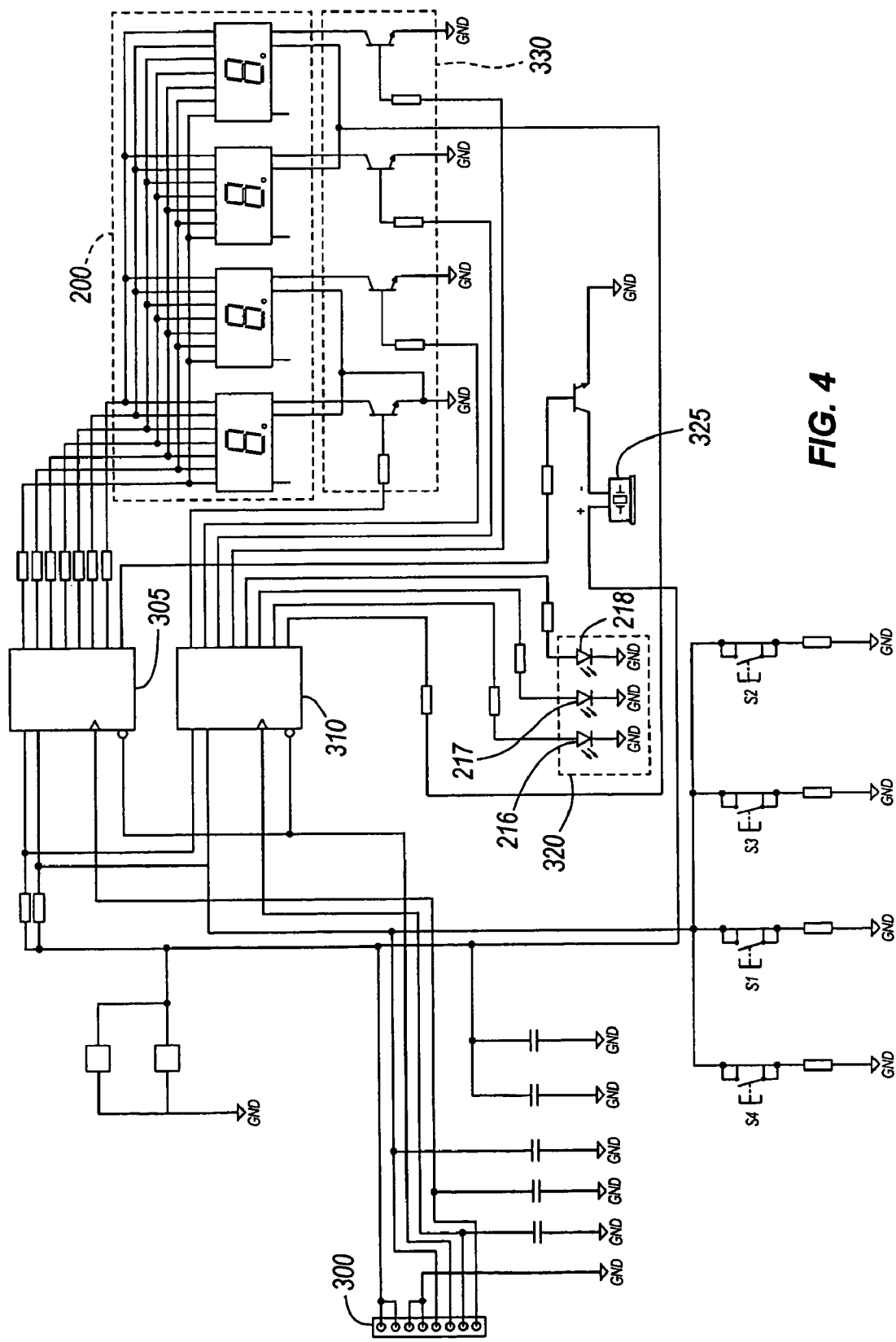
FIG. 4 is a circuit diagram of an exemplary circuit used in the cooking appliance.

An exemplary control panel circuit is illustrated in FIG. 4. Each input button on the control panel face 91 (shown in FIG. 3) corresponds to a button represented in the schematic. More specifically, the On/Off button 220, COOK button 230, TEMP button 225, and clock button 235 on the control panel face 91 correspond to the circuit schematic buttons S1, S2, S3, and S4, respectively. When the input buttons 220-235 are actuated, a signal is transmitted to a junction block 300 and to shift registers 305, 310. The junction block 300 is used to link a plurality of wires 301 (shown in FIG. 2) from the circuit board 92 to the main circuit board 72. The information transmitted via the plurality of wires 301 can be used by a controller (shown in FIG. 5) on the main circuit board 72 to control the operation of the heating element 111. The shift registers 305, 310 act as a serial-to-parallel converter. For instance, the shift registers 305, 310 receive the signals from the input buttons 220-235 and transmit signals to the LCD 200 as well as LED elements 216-218 (grouped as 320) and a buzzer 325. Power is supplied to the LCD 200 via a plurality of field effect transistors ("FETs") 330. The buzzer element 325, in the embodiment shown, is an electronic buzzer that is activated by a signal from the shift register 305. The buzzer element 325 can be activated to indicate that a function or operation has been requested or completed, for example, when an input button has been pressed, or a cooking cycle has begun or ended.

Figure 5:
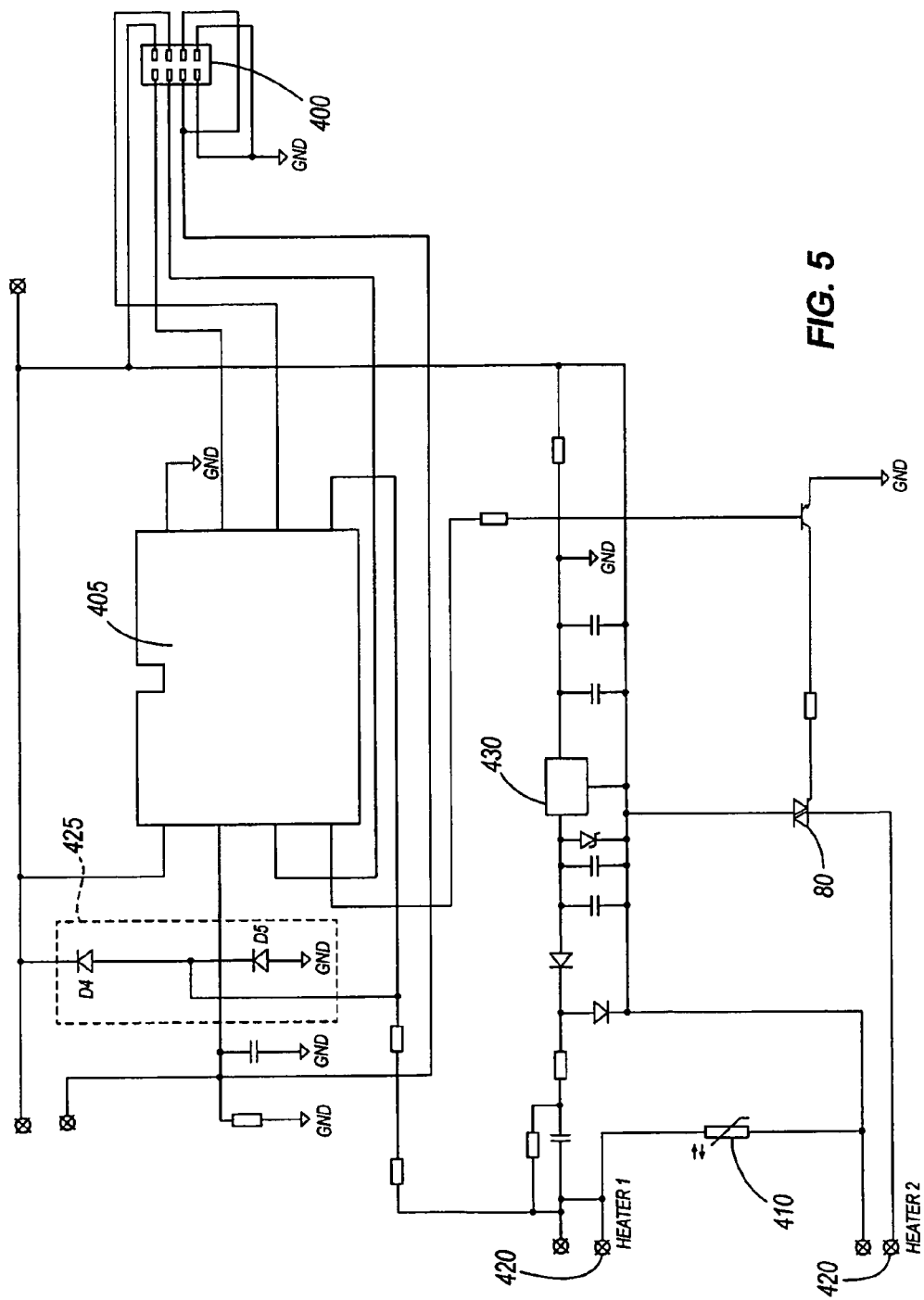
FIG. 5 is a circuit diagram of a second exemplary circuit used in the cooking appliance.

FIG. 5 is an exemplary circuit schematic diagram of the main circuit board 72. The previously described plurality of wires 301 from the junction block 300 (shown in FIG. 4) is linked to a junction block 400 (i.e., eight way cable connector), so that the signals transmitted from the circuit board 92 can be utilized by components of the main circuit board 72 and vice versa. For instance, a microprocessor, programmable device, or controller 405 receives signals from the circuit board 92 via the junction block 400, and uses those signals to control the functions of a variety of components of the cooking appliance 10. The controller 405 can also transmit data to the circuit board 92 and components such as the LCD 200 so that information is displayed on the control panel 90. The controller 405 receives temperature information from a thermistor 410, although various other and additional temperature sensors could be used. The controller 405 also controls the triac 80. In one embodiment, the controller 405 can be programmed or otherwise configured to control the amount of current supplied to the heating element 111 with the triac 80, and the amount of time that current is supplied.

In the embodiment shown, the thermistor 410 transmits a signal to the controller 405 indicative of the temperature of the heating element 111. When the WARM mode is selected, the controller 405 can use a thermistor signal as a temperature reference, and transmit a signal to the triac 80 to turn the heating element 111 on and off. The heating element 111 is linked to the main circuit board 72 by the heater leads "HEATER1 and HEATER2" 420. Several of the components included on the main circuit board 72 can be used to control power signals. For example, the diodes D4 and D5 425 are used to convert the alternating current ("AC") power (from, e.g., a household electrical outlet) to a direct current ("DC") power signal. A voltage regulator 430 is also included to provide a constant 5 volt DC signal to the controller 405. A circuit that is suitable for use as a controller in embodiments of the invention is a MC 908Q4CP from Motorola. Of course, other programmable controllers could be used.

The embodiments described above and illustrated in the figures are presented by way of example only and are not intended as a limitation upon the concepts and principles of the invention. As such, it will be appreciated by one having ordinary skill in the art that various changes in the elements and their configuration and arrangement are possible without departing from the spirit and scope of the invention. As should also be apparent to one of ordinary skill in the art, some systems and components shown in the figures are models of actual systems and components. Some control components described are capable of being implemented in software executed by a microprocessor or a similar device or of being implemented in hardware using a variety of components including, for example, application specific integrated circuits ("ASICs"). Thus, the claims should not be limited to the specific examples or terminology used in the examples provided.

Various features and advantages of the invention are set forth in the following claims.

What is claimed is:

1. A cooking appliance comprising:
   a heating unit having a housing and a base, the base lying substantially in a horizontal plane and having a perimeter which is connected to the housing;
   a heating well disposed within the heating unit and having a heating element;
   a cooking unit adapted to fit at least partially within the heating well;
   a control panel mounted to the housing, the control panel including a display and at least one input mechanism; and
   a programmable controller attached to the base of the heating unit and remotely from the control panel, the programmable controller configured to communicate with the control panel, to receive input information from the at least one input mechanism, and to control the heating element.

2. A cooking appliance as claimed in claim 1, wherein the control panel does not include an electronic programmable device.

3. A cooking appliance as claimed in claim 1, wherein the base has a depression and the controller is positioned above the depression.

4. A cooking appliance as claimed in claim 3, wherein the depression has a plurality of openings.

5. A cooking appliance as claimed in claim 1, wherein the heating well has a continuous sidewall, the sidewall having an interior surface that defines a well-like chamber and an exterior surface.

6. A cooking appliance as claimed in claim 1, wherein the control panel includes a plurality of markings.

7. A cooking appliance as claimed in claim 6, wherein the control panel includes a plurality of LEDs, where at least one LED of the plurality of LEDs is associated with one of the plurality of markings such that when a respective LED is activated the respective LED provides illumination to its associated marking.

8. A cooking appliance as claimed in claim 1, wherein the control panel includes at least one LED.

9. A cooking appliance as claimed in claim 1, wherein the display is an LCD.

10. A cooking appliance as claimed in claim 1, wherein the control panel includes a plurality of input devices.

11. A cooking appliance as claimed in claim 1, further comprising a circuit board coupled to a circuit board housing, wherein the heating unit includes an interior and the circuit board housing is positioned such that the circuit board is located in the interior.

12. A cooking appliance as claimed in claim 1, wherein the control panel extends one quarter of an inch or less from a front face of the cooking appliance.

13. A cooking appliance as claimed in claim 1, wherein the control panel is substantially flush with a front face of the cooking appliance.

14. A cooking appliance as claimed in claim 13, wherein the control panel and the controller are electrically linked by one or more wires.

15. A cooking appliance as claimed in claim 1, wherein the control panel includes a buzzer.

16. A cooking appliance as claimed in claim 1, further comprising a temperature sensor coupled to the programmable controller.

17. A cooking appliance as claimed in claim 10, wherein the programmable controller is further configured to control operation of the cooking appliance based on a sequence of inputs made by a user using the plurality of input devices.

18. A cooking appliance as claimed in claim 17, wherein the programmable controller is configured to operate in one of two modes: a manual mode and an automatic mode.

19. A cooking appliance as claimed in claim 17, wherein the control panel includes an On/Off button, and the programmable controller is configured to generate a signal to display "ON" on the display and to indicate a temperature setting by generating a signal to activate an LED.

20. A cooking appliance as claimed in claim 17, wherein the control panel includes a temperature button, and the programmable controller is configured to control the heating element according to a temperature setting selected by a user using the temperature button.

21. A cooking appliance as claimed in claim 17, wherein the control panel includes a cook button, and the programmable controller is configured to control the heating element based on a state of the cook button and display an elapsed cooking time.

22. A cooking appliance as claimed in claim 17, wherein the control panel includes a time button, and the programmable controller is configured to determine a desired cooking time based on input from the time button.

23. A cooking appliance as claimed in claim 17, wherein the programmable controller is configured to generate a signal or signals that cause the display to display a time.

24. A cooking appliance as claimed in claim 17, wherein the programmable controller is configured to enter a warm mode upon the expiration of a cooking time.

25. A cooking appliance comprising:
   a heating unit having a housing and a base, the base lying substantially in a horizontal plane and having a perimeter which is connected to the housing.
   a cooking unit configured to fit within the housing;
   a heating element positioned in the heating unit and configured to heat the cooking unit;
   a control panel mounted on the housing, the control panel including a display and at least one input mechanism; and
   a programmable controller coupled to an inside surface of the base and positioned remotely from the control panel, the programmable controller configured to communicate with the control panel, to receive input information from the at least one input mechanism and, to control the heating element.

26. A cooking appliance as claimed in claim 25, wherein the control panel does not include an electronic programmable device.

27. A cooking appliance as claimed in claim 25, wherein the control panel includes a plurality of markings.

28. A cooking appliance as claimed in claim 25, wherein the control panel includes a plurality of LEDs, where at least one LED of the plurality of LEDs is associated with one of the plurality of markings such that when a respective LED is activated the respective LED provides illumination to its associated marking.

29. A cooking appliance as claimed in claim 25, wherein the control panel includes at least one LED.

30. A cooking appliance as claimed in claim 25, wherein the display is an LCD.

31. A cooking appliance as claimed in claim 25, wherein the control panel includes a plurality of input devices.

32. A cooking appliance as claimed in claim 25, wherein the control panel extends one quarter of an inch or less from a front face of the cooking appliance.

33. A cooking appliance as claimed in claim 25, wherein the control panel is substantially flush with a front face of the cooking appliance.

34. A cooking appliance as claimed in claim 25, wherein the control panel and the programmable controller are electrically linked by one or more wires.

35. A cooking appliance as claimed in claim 25, wherein the control panel includes a buzzer.

36. A cooking appliance as claimed in claim 25, further comprising a temperature sensor coupled to the programmable controller.

37. A cooking appliance as claimed in claim 31, wherein the programmable controller is further configured to control operation of the cooking appliance based on a sequence of inputs made by a user using the plurality of input devices.

38. A cooking appliance as claimed in claim 31, wherein the programmable controller is configured to operate in one of two modes: a manual mode and an automatic mode.

39. A cooking appliance as claimed in claim 31, wherein the control panel includes an On/Off button, and the programmable controller is configured to generate a signal to display "ON" on the display and to indicate a temperature setting by generating a signal to activate an LED.

40. A cooking appliance as claimed in claim 31, wherein the control panel includes a temperature button, and the programmable controller is configured to control the heating element according to a temperature setting selected by a user using the temperature button.

41. A cooking appliance as claimed in claim 31, wherein the control panel includes a cook button, and the programmable controller is configured to control the heating element based on a state of the cook button and display an elapsed cooking time.

42. A cooking appliance as claimed in claim 31, wherein the control panel includes a time button, and the programmable controller is configured to determine a desired cooking time based on input from the time button.

43. A cooking appliance as claimed in claim 31, wherein the programmable controller is configured to generate a signal or signals that cause the display to display a time.

44. A cooking appliance as claimed in claim 31, wherein the programmable controller is configured to enter a warm mode upon the expiration of a cooking time.

45. A method of using a programmable cooking appliance having a housing with an outer surface and a base, the base lying substantially in a horizontal plane and having a perimeter which is connected to the outer surface, the method comprising:
   providing a cooking unit to hold food;
   associating a heating element with the cooking unit;
   configuring a control panel without a programmable device;
   positioning the control panel on the housing such that it protrudes from the outer surface of the housing one quarter of an inch or less;
   delivering one or more signals from the control panel to a programmable controller attached to the base and located remotely from the control panel; and configuring the programmable controller to control operation of the heating element based upon information input by a user through the control panel.

46. A method of claim 45, further comprising selecting a cooking temperature and time using the control panel.

47. A method of claim 45, further comprising configuring the controller to change an operating mode of the appliance from a cooking mode to a warming mode upon an expiration of the cooking time.

48. A method of claim 45, further comprising notifying a user with illuminated indicators that the programmable cooking appliance is powered and that a timer is active.

49. A method of maintaining a programmable device in a cooking appliance within an acceptable temperature range, the method comprising:

provviding a housing and a base, the base lying substantially in a horizontal plane and having a perimeter which is connected to the housing;

configuring a cooking unit to fit within the housing;

positioning and configuring a heating element to heat the cooking unit;

configuring a control panel with at least one input mechanism and a display, but without a programmable device;

mounting the control panel on the housing; and attaching a programmable controller to the base and remotely from the control panel, and configuring the programmable controller to communicate with the control panel, receive input information from the at least one input mechanism, and control the heating element.

50. A method of claim 49, wherein mounting the control panel includes mounting the control panel so that it protrudes from a face of the housing one quarter of an inch or less.

51. A method of claim 50, wherein mounting the control panel includes mounting the control panel so that it is substantially flush with a face of the housing.

* * * * *